United States Patent [19]

Varadi

[11] Patent Number: 5,540,881
[45] Date of Patent: Jul. 30, 1996

[54] APPARATUS AND PROCESS FOR AUTOMATICALLY BLOWING A BUBBLE

[76] Inventor: John L. Varadi, 13 Randy Dr., Taylors, S.C. 29687

[21] Appl. No.: 109,845

[22] Filed: Aug. 19, 1993

Related U.S. Application Data

[63] Continuation of Ser. No. 909,864, Jul. 7, 1992, abandoned.

[51] Int. Cl.$^6$ ................................................ B29C 55/28
[52] U.S. Cl. ............................ 264/564; 264/39; 264/565; 264/566; 425/72.1; 425/326.1
[58] Field of Search .................................. 264/564, 563, 264/567, 569, 290.2, 40.3, 39; 425/326.1, 72.1

[56] References Cited

U.S. PATENT DOCUMENTS

| | | | |
|---|---|---|---|
| 3,313,870 | 4/1967 | Yazawa | 264/567 |
| 3,426,113 | 2/1969 | Yazawa | 264/314 |
| 3,456,044 | 7/1969 | Pahlke | 264/25 |
| 3,555,604 | 1/1971 | Pahlke | 18/14 |
| 3,608,019 | 9/1971 | Sato et al. | 425/326.1 |
| 3,741,253 | 6/1973 | Brax et al. | 138/137 |
| 3,960,997 | 6/1976 | Sorensen | 425/326.1 |
| 4,112,181 | 9/1978 | Baird, Jr. et al. | 428/336 |
| 4,290,996 | 9/1981 | Hayashi et al. | 425/326.1 |
| 4,355,966 | 10/1982 | Sweeney et al. | 425/326.1 |
| 4,462,779 | 7/1984 | Brinkmeier et al. | 425/326.1 |
| 4,869,863 | 9/1989 | Iwai et al. | 425/326.1 |
| 4,983,337 | 1/1991 | Kojoh et al. | 425/326.1 |

FOREIGN PATENT DOCUMENTS

| | | |
|---|---|---|
| 306958A | 9/1987 | European Pat. Off. . |
| 1351963 | 3/1963 | France . |
| 1272527 | 7/1968 | Germany . |
| 43-25839 | 11/1968 | Japan ................................. 264/290.2 |
| 45-39476 | 12/1970 | Japan ................................. 264/564 |
| 47-47984 | 12/1972 | Japan ................................. 264/567 |
| 52-10155 | 3/1977 | Japan ................................. 264/567 |
| 55-150326 | 11/1980 | Japan . |
| 63-122515 | 5/1988 | Japan . |
| 1002752 | 8/1965 | United Kingdom . |
| 2201371 | 9/1988 | United Kingdom . |

*Primary Examiner*—Jeffery R. Thurlow

[57] ABSTRACT

The present invention relates to an apparatus for automatically blowing a bubble in the production of tubular biaxially stretch oriented thermoplastic flexible film by the "bubble" method comprising a high flow fluid conduit having a proximal end for introducing a high flow fluid, and a distal end substantially perpendicular to said proximal end, and having attached to said distal end a bullet mounted proximate to the distal end of the high fluid flow conduit through which the high flow fluid may pass into the tubular thermoplastic film; a cutting device located on said high flow fluid conduit and in line with the bullet, said high flow fluid conduit, bullet, and cutting device disposed downstream from a first and second pair of rolls defining the bubble; and an automatic bubble blowing control system means comprising means for controlling the flow of fluid into the interior of the tape, and means for controlling the speed of a driven set of squeeze rolls located downstream from the high flow fluid conduit. A process for the automatic production of the isolated bubble in the production of tubular film is also disclosed.

12 Claims, 4 Drawing Sheets

APPARATUS AND PROCESS FOR AUTOMATICALLY BLOWING A BUBBLE

This application is a Continuation of application Ser. No. 909,864, filed on Jul. 7, 1992, now abandoned.

BACKGROUND OF THE INVENTION

1. Field of the Invention

This invention relates to the production of biaxially stretch oriented thermoplastic flexible film utilizing the "bubble" method and particularly to an automated mechanical device the for production of the isolated bubble.

2. Description of the Related Art

The process of biaxially orienting films from a variety of thermoplastic materials is well known as are the advantages of the biaxially oriented films so produced. Biaxially oriented films of polypropylene, high-density polyethylene, polystyrene, and polyvinylidene chloride have achieved substantial commercial recognition.

The "bubble" method of biaxially orienting tubular films is also well known in the art and has achieved substantial commercial recognition. For example, U.S. Pat. No. 3,456,044 (Pahlke) teaches one type of bubble method by disclosing an apparatus for the production of biaxially oriented film and this type of method is called the "double bubble" method. U.S. Pat. No. 3,555,604 (Pahlke) teaches the biaxially oriented film produced using the apparatus of U.S. Pat. No. 3,456,044 (Pahlke) using the "double bubble method". Another type of bubble method for the production of a film, such as a saran film, using the "trapped bubble" method is known for example from U.S. Pat. No. 4,112,181 (Baird) and U.S. Pat. No. 3,741,253 (Brax et al.). By saran, is meant copolymers of vinylidene chloride, and it is noted that the term "saran" has become generic in the United States for such copolymers. The disclosures of all of these patents are incorporated herein by reference.

By the "bubble" method of biaxially orienting thermoplastic film is meant a process in which a primary tubing is first formed by melt extrusion from a die, inflated by the admission of air, cooled, and collapsed. In the double bubble process, this first stage also involves a bubble, typically referred to as the primary bubble, which is cooled and collapsed as a tape. But in the trapped bubble process, this first stage does not involve a bubble, so the primary is typically referred to as a primary tape. Regardless, in the second stage, the collapsed tube (typically called a tape) is then reinflated to form an isolated bubble. The tubing is advanced through a heating zone to raise the film to its draw temperature. In the double bubble process, the heating is directly onto the inflated isolated bubble in the expansion zone, whereas in the trapped bubble process the heating is directly on the collapsed tape, such as via a hot water or hot air tank, prior to inflation of the isolated bubble in the expansion zone. In a draw or expansion zone the tubing is radially expanded in both the transverse and machine directions at a temperature such that orientation occurs in both directions. The material is then rapidly cooled to set the orientation.

Typically, the drawing of this isolated bubble is done by a person by threading the formed, inflated, cooled and deflated thermoplastic tape through a first set of rolls, which are then closed up (or down in some bubble processes) through a second set of rolls, in an open position, located some distance away from the first set of rolls and then grabbed by a human operator. The human operator inserts a high flow air hose into the end of the tape, seals the tape around the nozzle end of the air hose and then using low flow pulses of air inflates the tape from the point where the tape is attached to the air hose to the closed first set of rolls. Next the human operator starts the bubble by pulsing air, typically high flow air but low flow air is sometimes used, or if the thermoplastic tape is not elastic enough, yanks with force on the tape while simultaneously pulsing high and/or low flow air. Once the bubble is started the human operator must continue pulsing high pressure air into the tape to build the bubble to the required size. Because the tape is expanded from about 3 to about 7 times in both the transverse and machine directions, the length of the tape also increases from 3 to 7 times requiring the human operator to move back away from the film orienting machinery. Further, because the human operator must constantly pulse high flow air and visually monitor the bubble formation, the human operator is forced to walk backwards away from the film orienting machinery staying clear of the high flow hose trailing behind him or her. The speed of the whole operation is therefore determined by the speed at which the human operator can create the bubble while moving backwards. This requires a strong, agile, skilled human operator to create a bubble of desired size and at the fastest possible speed. This operation is also one of great concern from a safety standpoint in that it requires a great distance of clear space for the human operator to move, and requires the human operator to move backwards without being able to see where he or she is going. Also, large companies, which can afford it, have the second set of rollers on a vertically movable elevator in order to adjust bubble size after a bubble is brought up by the human operator. But small companies cannot afford the elevator and so the second set of rollers is vertically stationary, so if the brought up bubble is the wrong size, the human operator must bring it down (break it) and start over.

OBJECTS AND SUMMARY OF THE INVENTION

It is an object of this invention to provide an apparatus for the automatic blowing of the isolated bubble in the second stage for oriented, thermoplastic, flexible films which does not require a human operator to move physically with the expanding tape.

It is a further object of this invention to provide an apparatus which automatically blows a bubble at greater speeds than possible manually.

It is another object of this invention to remove the safety hazards associated with the manual blowing of the bubble.

It is yet another object of this invention to allow for automatic, continuously variable tape speed change to allow for the desired bubble size.

It is an advantage of the present invention that once the human operator decides upon which is the correct size bubble to bring up (where the apparatus does not have the elevator but rather the second set of rollers are stationary), then the apparatus of the invention can be used to re-bring up that desired bubble size so the human operator does not have to guess at the correct size, accidentally bring up the wrong size, break the wrong bubble and start over. Thus the time of breaking the bubble and starting over is avoided, as once a correct bubble size is determined the apparatus of the present invention can be set to repeat it.

These and additional objects and advantages will become apparent from the description and accompanying drawings.

One form of the present invention relates to an apparatus for automatically blowing the bubble in the second stage of the tubular production of biaxially oriented thermoplastic flexible film by the "bubble" method comprising a high flow fluid conduit having a proximal end for introducing a high flow fluid, and a distal end substantially perpendicular to said proximal end and having attached to said distal end, a bullet through which the high flow fluid may pass into the interior of the thermoplastic film tape, a cutting device such as a rotating knife located on said high flow fluid conduit, and an automatic bubble blowing control system means.

Another form of the present invention relates to an apparatus for automatically blowing the bubble in the second stage of the tubular production of biaxially stretch oriented thermoplastic film by the "bubble" method comprising a high flow fluid conduit having a proximal end for introducing a high flow fluid, and a distal end substantially perpendicular to said proximal end and being attached to said distal end, a bullet through which the high flow fluid may pass into the interior of the thermoplastic film tape, a cutting device such as a rotating knife located on said high pressure fluid conduit, an automatic bubble blowing control system means, a variable speed driven set of squeeze rolls, and a variable speed wind-up reel. Also, scrap can go directly from the squeeze rolls into a scrap basket.

Yet another form of the present invention relates to a process for the automatic production of the isolated bubble in the second stage of the tubular production of biaxially stretch oriented thermoplastic film comprising the steps of placing the thermoplastic film tape over the bullet, bringing the tape under the cutting device, injecting low flow fluid through said bullet inflating the tape, using an automatic bubble blowing control system, and injecting high flow fluid through said bullet, using the automatic bubble blowing control system, thereby producing the desired bubble in said thermoplastic film tape.

A further form of the present invention relates to a process for the automatic production of the isolated bubble in the second stage of the tubular production of biaxially stretch oriented thermoplastic film comprising the steps of placing the thermoplastic film tape over the bullet, bringing the tape under the cutting device, feeding the tape through a set of driven squeeze rolls, feeding the tape onto a wind-up reel, injecting low flow fluid through said bullet inflating the tape, using an automatic bubble blowing control system, and injecting high flow fluid through said bullet, using the automatic bubble blowing control system, thereby producing the desired bubble in said thermoplastic film tape.

Preferred forms of the automatic bubble blower for tubular biaxial stretch orientation film lines, as well as other embodiments, objects, features and advantages of this invention, will be apparent from the following detailed description, and illustrative embodiments thereof, which are to be read in connection with the accompanying drawings.

BRIEF DESCRIPTION OF THE DRAWINGS

The invention will be more fully understood from the following description and accompanying drawings wherein.

Figure 1:
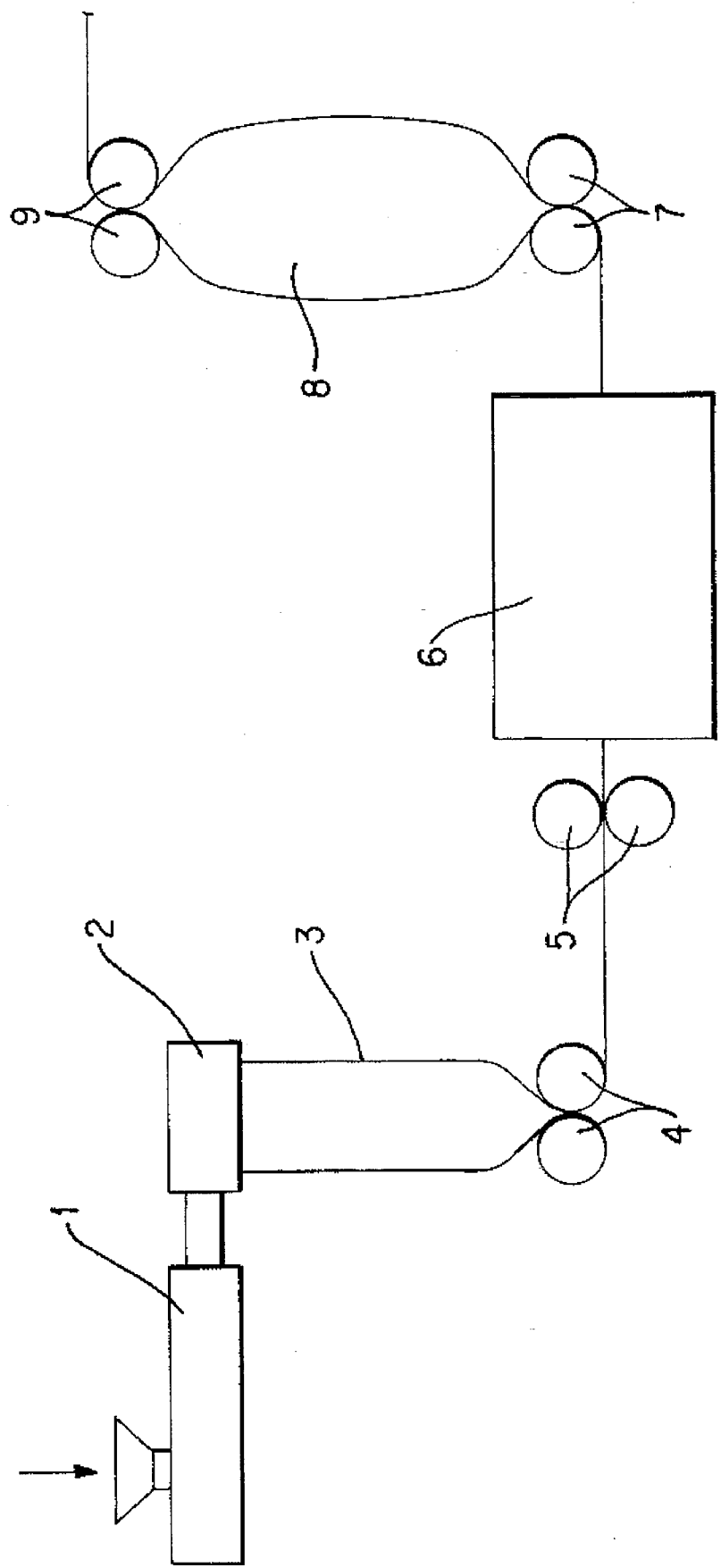
FIG. 1 is a schematic illustration of the tubular "bubble" process for producing biaxially oriented films known in the art.

DESCRIPTION OF THE PREFERRED
EMBODIMENTS OF THE INVENTION

In general, after the post extrusion cooling of the first stage, the "tape" extrudate is then reheated to a temperature within its orientation temperature range and stretched to orient or align the crystallites and/or molecules of the material and then cooled. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented. The terms "orientation" or "oriented" are used herein to describe generally the process steps and resultant product characteristics obtained by stretching and immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction monoaxial orientation results. When the stretching force is simultaneously applied in two directions biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

The present invention will be better understood from the specification taken in conjunction with the accompanying drawings in which like reference numerals refer to like parts. The invention is described below substantially with particular reference substantially to the tubular biaxial stretch orientation process shown in U.S. Pat. No. 4,112,181 (Baird), the disclosure of which is incorporated herein by reference. But it is to be understood that the invention is not to be limited thereby and may be used with any tubular "bubble" process for biaxially stretch orienting thermoplastic film.

By the terms "oriented film", "heat-shrinkable film" and the like, it is meant to refer to a stretched thermoplastic flexible film, which will, when heated to an appropriate temperature, for instance 90° C., show a free shrink of at least 5% in at least one of the transverse or longitudinal directions.

The primary tubular plastic film tape hereinafter "tape", can be made by any of the known techniques for extrusion of tubular flexible plastic film. For example, as seen in FIG. 1, the polymer resin is fed into an extruder (1) wherein it is heated to an appropriate temperature, e.g., 50°–70° C. above the melting point of the polymer to cause the melting thereof. The extruder forces molten polymer through a die (2) having an air supply (not shown) to inflate or expand the tape (3) to the desired diameter by introducing sufficient air into the interior thereof. The inflated tape (3) is drawn through a pair of rotating squeeze rolls (4) which serve to collapse and flatten the tubing and retain the air in that portion of tubing between the squeeze rolls and the die. The tape can be reeled and then separately oriented or can be oriented in line as shown in FIG. 1.

To orient in line, the primary tape (3) is flattened and then passes through driven squeeze rolls (5), then is reheated to a temperature at which the film becomes drawable and orients when stretched but below the temperature at which the tape merely thins out when stretched without appreciable orientation in an oven (6). Alternatively, oven 6 could be a hot water tank. The tape (3) then passes to driven squeeze rolls (7), then is reinflated to form a biaxially stretched bubble (8) which is drawn vertically upward and cools during its upward travel. It is noted that in some orientation processes, bubble (8) moves vertically downwards instead of upwards and/or the heating is directly onto bubble (8) instead of prior to bubble (8) via oven/tank (6).

The tape (3) then contacts a series of converging rolls (not shown) and is flattened by driven squeeze rolls (9). The peripheral speed of the squeeze rolls (9) is greater than that of squeeze rolls (7) in order either to pick up slack formed during biaxial stretching or to impart additional machine (longitudinal) direction stretch. Thus, the desired machine orientation of the tape (3) is produced during its passage through the apparatus between the squeeze rolls (7) and (9) (machine direction) as well as the desired transverse orientation (transverse direction). After passing through squeeze rolls (9) and tape (3) is passed over suitable guide rolls (not shown) and wound up on a wind-up reel (also not shown) the tension of which is controlled. If sheeting is desired, the tape (3) may be slit after passing through the squeeze rolls (9). As mentioned above, large companies that can afford it have these rolls (9) on a vertically movable elevator so bubble size can be adjusted. But small companies, that cannot afford it, have these rolls (9) vertically stationary, so a human operator must break a wrong size bubble and start over.

Previous to the instant invention the production of the bubble needed to orient the tape has been done manually. Typically, the reheated tape (3) is fed by hand through squeeze rolls (7) and these squeeze rolls were then closed. The tape (3) was then fed by hand upward past the series of converging rolls and through the upper squeeze rolls (9) which are left open, over suitable guide rolls and then downward to the floor to an operator. The human operator then manually attached the tape (3) around a high flow air hose and manually pulsed low flow air into the tape (3) to inflate it all the way back to closed squeeze rolls (7). At this point the operator pulsed low and/or high flow air into the tape (3) while simultaneously sharply tugging on the tape (3) to initiate the bubble just above the squeeze rolls (7), and walked backwards to take up the increased length of the tape caused by the machine direction stretching of the tape during the bubble production. Once the bubble has been produced the upper squeeze rolls (9) are closed and their distance from the lower squeeze rolls (7) adjusted to provide the desired bubble diameter, the tape (3) beyond the squeeze rolls (9) is cut off and the tape (3) is then manually guided over suitable guide rolls and onto a wind-up reel. Finally, the now scrap cut length of tape is manually removed from the floor and discarded or recycled to the extruder.

This process has several disadvantages which limit the production rate of the operation. The speed, and skill of the operator in initiating the bubble determines the speed of the line. The faster the operator can make the bubble the faster the line can run. However, the operator must have skill in pulsing the low and high flow air into the tape from a heavy high flow hose while at the same time moving backwards to take up the slack created by the machine direction stretching of the tape. This stretching is commonly 3 to 7 times the original tape distance which means the operator is moving backwards for up to several hundred feet. Further, because the operator must keep constant visual contact with the emerging bubble he or she is forced to move backwards without being able to see behind him or her or being able to locate the high pressure hose moving behind him or her. This results in the need for a large clear area for the operator to be able to move in as well as to keep the tape and the high flow hose clear of obstacles. In addition, the high flow hose, typically 2 inches in diameter and under about 80 psi, requires that the operator have good physical strength as well as agility. Another problem encountered is that of the size of the bubble created by the operator. If it is not the desired size for orienting the tape the upper squeeze rolls after being closed must be lowered to increase the transverse direction size (diameter) of the bubble, but the lowering necessarily decreases the machine direction size (length) of the bubble. The shorter bubble may not produce the desired bubble geometry than if the bubble had been of a longer size. Typically, the length of the bubble must be reduced from 3 to 5 feet after being manually blown to allow the desired transverse direction diameter to be realized. It is known that if the converging angle, which is going from the blown bubble tube to the lay flat web path, is too flat an angle, then there can be a problem with excess slack that can lead to undesirable gauge variation. It is recognized in the art that the longest possible bubble is desired, and the instant invention allows for the longest possible bubble.

The instant invention eliminates the necessity of having an operator manually produce the bubble and removes the need for large clear areas behind the operator during bubble creation. In addition the instant invention can increase the line speed by a significant amount and produce a bubble of maximum length.

Figure 2:
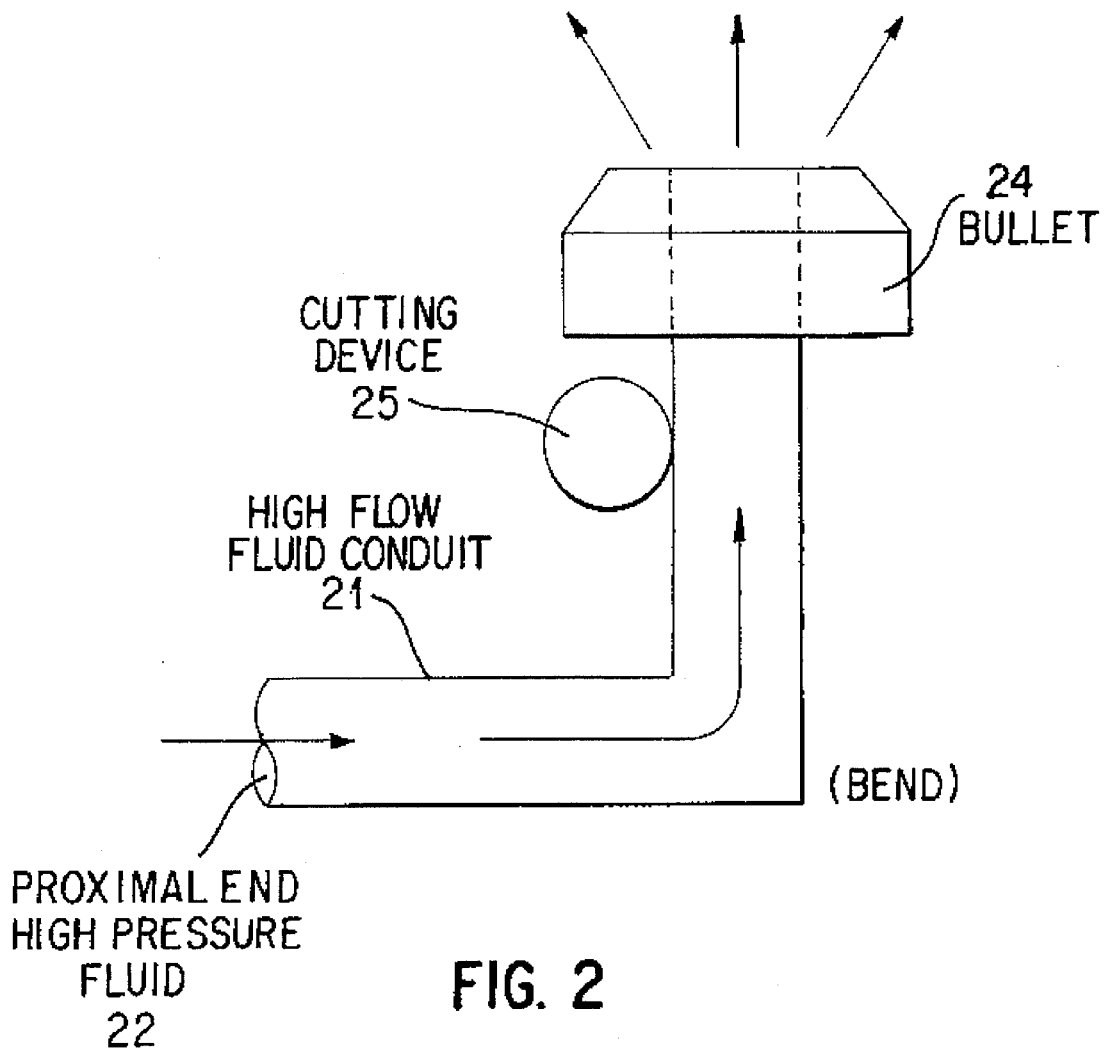
FIG. 2 is a partial schematic illustration of the present invention.

Turning once again to the Figures, FIG. 2 shows the essential elements of the instant invention comprising a high flow fluid conduit (21), having a proximal end for the introduction of a high pressure fluid (22) and a distal end (23) having removably attached thereto a head or bullet (24), and a cutting device (25) mounted on the high pressure fluid conduit (21) and in line with the bullet (24) to cut the tape thereby allowing the tape to pass around the high pressure conduit (21) during the bubble blowing process. It is to be understood that the high pressure conduit has a bend between the proximal end and the distal end to allow the tape to pass around the automatic bubble blowing apparatus. Cutting device (25) may be stationary or it may be movable, such as it may be a rotating knife.

Figure 3:
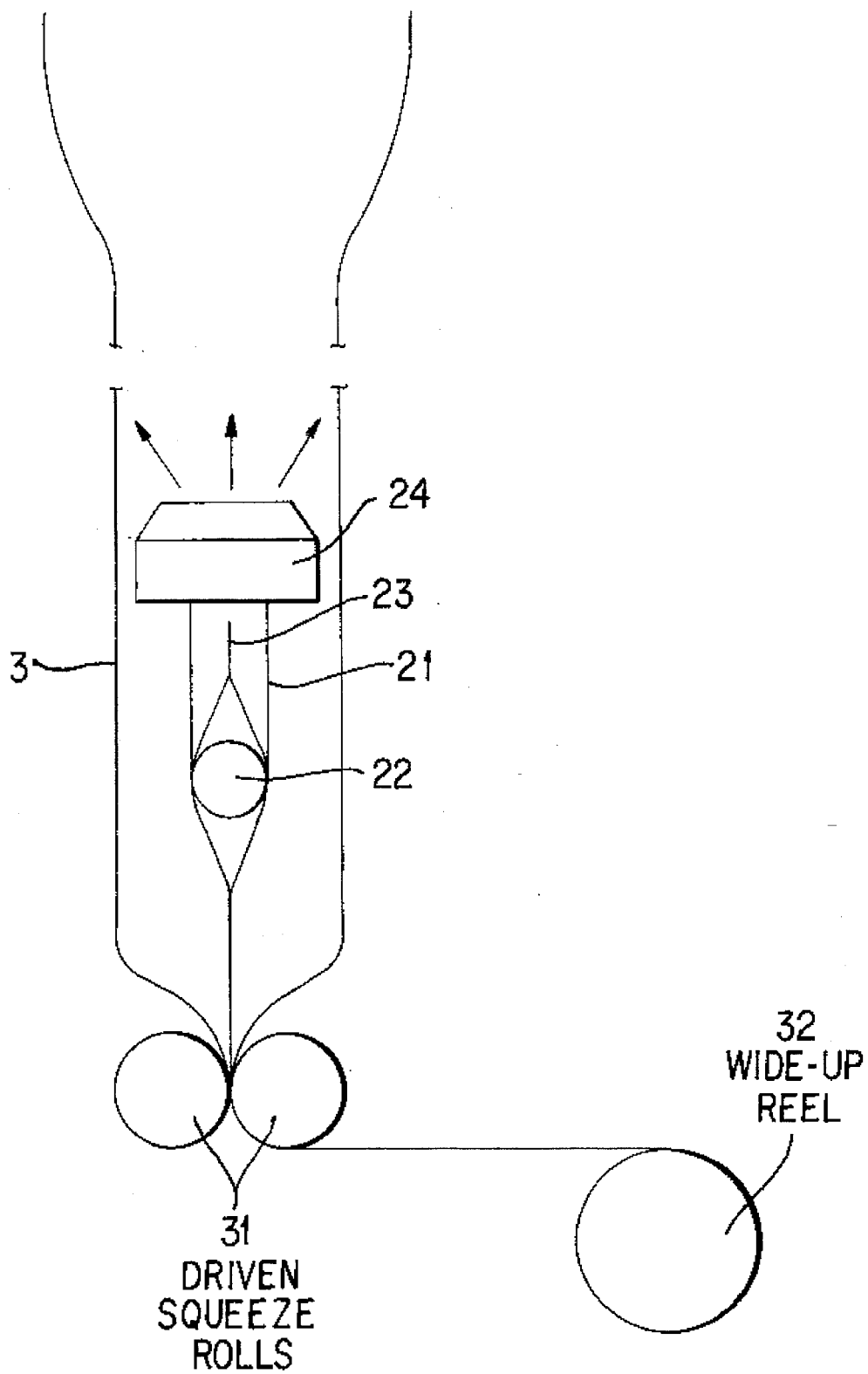
FIG. 3 is a partial schematic illustration of the present invention in operation.

FIG. 3 shows the instant invention comprising a high pressure fluid conduit (21), having a proximal end for the introduction of a high pressure fluid (22) and a distal end (23) having removably attached thereto a head or bullet (24), and a cutting device, such as a rotating knife (25) mounted on the high pressure fluid conduit (21) and in line with the bullet (24) to cut the tape thereby allowing the tape to pass around the high pressure conduit (21) during the bubble blowing process, a set of driven squeeze rolls (31) for deflating the tape and a wind-up reel (32) for collecting the scrap tape.

Figure 4:
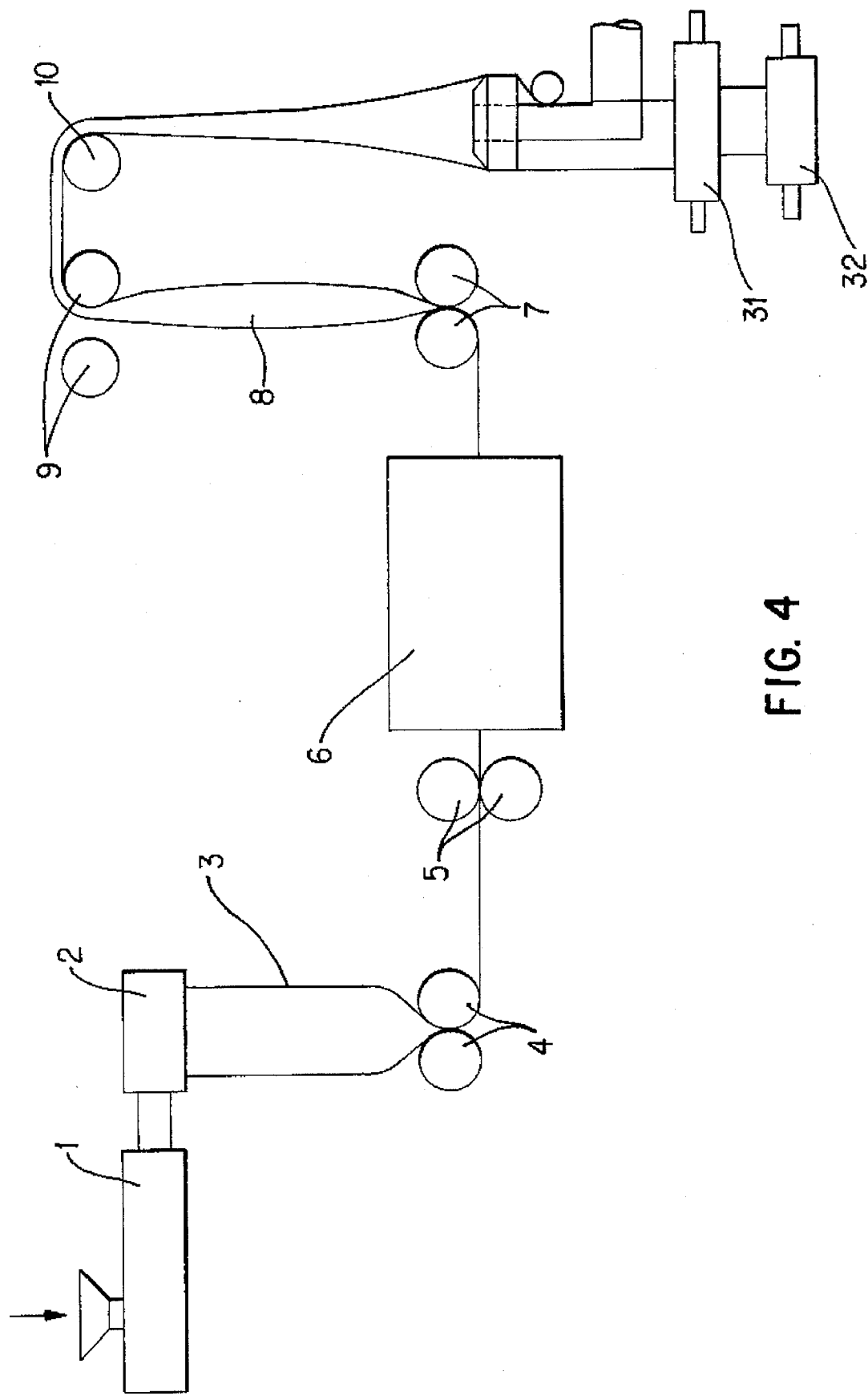
FIG. 4 is a schematic illustration of the tubular "bubble" process for producing biaxially oriented films using the present invention.

FIGS. 3 and 4 illustrate the process of the instant invention for producing a biaxially stretch oriented film wherein the polymer resin is fed into an extruder (1) wherein it is heated to an appropriate temperature, e.g., 50°–70° C. above the melting point of the polymer to cause the melting thereof. The extruder forces molten polymer through a die (2) having an air supply (not shown) to inflate or expand the tape (3) to the desired diameter by introducing sufficient air into the interior thereof. The inflated tape (3) is drawn through a pair of rotating squeeze rolls (4) which serve to collapse and flatten the tape (3) and retain the air in that portion of tape (3) between the squeeze rolls and the die. The tape (3) can be reeled and then separately oriented or can be oriented in line as shown in FIG. 4.

To orient in line, the primary tape (3) is flattened and then passes through driven squeeze rolls (5), then is reheated to a temperature at which the film becomes drawable and orients when stretched but below the temperature at which the tape merely thins out when stretched without appreciable orientation in an oven or hot water tank (6). The tape (3) then passes to driven squeeze rolls (7), then is reinflated to form a bubble (8) which is drawn vertically upward and is cooled during its upward travel.

According to the instant invention the production of the bubble is automated to eliminate the manual bubble blowing operation. Typically, the reheated tape (3) is fed by hand through squeeze rolls (7) and these squeeze rolls are then closed. The tape (3) is then fed by hand upward past the series of converging rolls (not shown) and through the upper squeeze rolls (9) which are left open, over suitable guide rolls (10) and then downward to the floor to an operator. The operator, with the assistance of low fluid flow into the tape if necessary, places the tape (3) over the bullet (24) and under rotating knife (25) through driven squeeze rolls (31) and onto wind up reel (32). This is typically done at oven (6) process speed. The operator then activates the automatic bubble blowing control system (not shown) which inflates the tape (3), speeds up driven squeeze rolls (31), if needed, to provide a continuous speeding up of the tape to initiate the bubble (8) above squeeze rolls (7), and then blows the bubble (8) having the desired transverse diameter and maximum length between rolls (7) and rolls (9). In one preferred control system configuration, the operator activates the bubble blowing operation by holding down a control button which allows high pressure fluid into the interior of the tape and once the bubble (8) is blown and the squeeze rolls (9) are closed the operator releases the button which closes the high pressure fluid control valve and shuts off the flow of high pressure fluid. The driven squeeze rolls (31) speed is increased to take slack created by the machine direction stretching of the bubble (8) and the wind up reel also increases speed to take up the scrap tape produced during the bubble blowing operation, these functions being automatically controlled by the automatic bubble blowing control system (not shown). Once the desired bubble (8) is blown the driven squeeze rolls (9) are closed, the automatic bubble blowing apparatus of the instant invention is stopped and the tape is cut in front of bullet (24). The collapsed biaxially oriented tubing after the bubble (8) is then passed over suitable guide rolls (not shown) and wound up on a wind-up reel (also not shown) the tension of which is controlled. It is then processed in a known manner by contacting a series of converging rolls (not shown) and flattened by driven squeeze rolls (9). The peripheral speed of the squeeze rolls (9) is greater than that of squeeze rolls (7) in order either to pick up slack formed during biaxial stretching or to impart additional machine direction stretch of bubble (8). Thus, the desired orientation is produced during passage through the apparatus between the squeeze rolls (7) and (9) (machine direction) as well as transversely thereto (transverse direction). If sheeting is desired, the oriented tubing may be slit after passing through the squeeze rolls (9). Typically the oriented tubing is stored on the wind-up reel to be later cut into bags.

The bullet or head (24) may be made of any suitable material, preferably metal. Further the bullet (24) is preferably made to be detachable from the high pressure conduit (21) such that different sized bullets may be used for different sized tapes (3). In this respect it is to be understood that the diameter of the bullet (24) should be several inches smaller than the diameter of the tape (3) to be oriented. Preferably the diameter of the bullet (24) is from about half inch to about 4 inches, more preferably from about 1 inch to about 3 inches smaller than the diameter of the tape (3). It has been surprisingly found that this rather loose fit and the opening cut in the tape by the rotating knife (25) do not hinder the successful blowing of the bubble used to orient the film. In fact, it has been found that the bubble blown with the instant invention seldom requires the squeeze rolls (9) to be lowered more than a foot to provide the desired bubble diameter which is a 3 to 5 time improvement over the bubble blown using the known manual operator blown bubble system.

The automatic bubble blowing control system contains a means of controlling the flow of low flow fluid into the interior of the tape, and a means of controlling the flow of high flow fluid into the interior of the tape. Suitable means include, for example, electrically controlled and pneumatically controlled valves. The control system also contains a means of controlling and changing the speed of the squeeze rolls (31) and the wind-up reel (32). Suitable means include sensor controlled electric motors for example. The control system further contains circuitry which allows for the programming of the desired tape bubble orientation speed. Not shown in the drawings, but instead of winding up scrap on reel (32), alternatively (32) could be a roll to feed scrap into a scrap basket. It is to be understood that the devices and connecting means are well known in the art and may be realized without undue experimentation.

It is to be understood that the automated bubble blowing process of the instant invention may be done at much higher speeds than can be realized by manually blowing the bubble. Typically, the automatic bubble blowing apparatus and method of the present invention realizes a 30% to 250% increase and more in line speed over that attainable using the known manual method. This allows the line to be run at these higher speeds throughout the production run. This increases production by a substantial amount and at the same time eliminates a major safety problem in producing oriented films.

it is to be further understood that the orienting of certain polymeric materials (where there is no need to use low flow inflation and stretching of the tape for initiation followed by high flow inflation and stretching to produce the bubble, but rather just the high flow inflation and stretching can be used) is also contemplated by the present invention. An example of such a material is polypropylene.

Although the illustrative embodiments of the present invention have been described herein with reference to the accompanying drawings it is to be understood that the invention is not limited to those precise embodiments, and that various other changes and modifications may be effected therein by one skilled in the art without departing from the scope or spirit of the invention.

What is claimed is:

1. An apparatus for automatically blowing a bubble in the production of tubular biaxially stretch oriented thermoplastic flexible film by the "bubble" method comprising:

(a) a high flow fluid conduit having a proximal end for introducing a high flow fluid, and a distal end substantially perpendicular to said proximal end, and having attached to said distal end (b) a bullet mounted proximate to the distal end of the high flow fluid conduit through which the high flow fluid may pass into the tubular thermoplastic film;

(c) a cutting device located on said high flow fluid conduit and in line with the bullet, said high flow fluid conduit, bullet, and cutting device disposed downstream from a first and second pair of rolls defining the bubble; and (d) an automatic bubble blowing control system means comprising:
  (i) means for controlling the flow of fluid into the interior of the tape, and
  (ii) means for controlling the speed of a driven set of squeeze rolls located downstream from the high flow fluid conduit.

2. The apparatus as claimed in claim 1, wherein said bullet is detachable from said high flow fluid conduit.

3. The apparatus as claimed in claim 1, wherein said bullet has a diameter of from about 0.5 inches to about 4 inches smaller than the diameter of the tubular thermoplastic film to be oriented.

4. The apparatus as claimed in claim 1, wherein the high flow fluid is high flow air.

5. The apparatus as claimed in claim 1, wherein said bubble blowing control system has a means of pulsing high flow fluid and a means of pulsing fluid at a lower flow into said tubular thermoplastic film.

6. A process for the automatic production of the isolated bubble in the production of tubular biaxially stretch oriented thermoplastic flexible film comprising the steps of:

(a) placing a thermoplastic tubular film tape over a bullet, the bullet mounted proximate to a distal end of a high flow fluid conduit through which a high flow fluid may pass into the tubular thermoplastic film, the high flow fluid conduit also having a proximal end for introducing the high flow fluid, said proximal end being substantially perpendicular to said distal end;

(b) bringing the tubular tape under a cutting device, said high flow fluid conduit, bullet, and cutting device disposed downstream from a first and second pair of rolls defining the bubble;

(c) activating an automatic bubble blowing control system to open a controlled valve;

(d) injecting high flow fluid through the bullet, by means of the controlled valve, to inflate the tubular tape; and (e) feeding the tape through a set of driven squeeze rolls; thereby producing the desired bubble in said thermoplastic tubular film tape.

7. The process as claimed in claim 6, wherein said process includes the additional step of:

feeding the tape onto a wind-up reel,
after bringing the tape under the cutting device and before injecting fluid into said tape.

8. The process as claimed in claim 7, wherein said set of driven squeeze rolls are quickly sped up, providing a sharp tugging in the machine direction on the tape thereby helping to initiate the bubble.

9. The process as claimed in claim 6, wherein the tape is stretched in both the machine direction and the transverse direction from about 3 to about 7 times its initial size.

10. The process as claimed in claim 7, wherein the tape is stretched in both the machine direction and the transverse direction from about 3 to about 7 times its initial size.

11. The apparatus of claim 1 further comprising a variable speed wind-up reel located downstream from the driven set of squeeze rolls.

12. The process of claim 6 further comprising the step of injecting low flow fluid into the tubular tape while placing the tape over the bullet.

* * * * *